United States Patent

[11] 3,594,799

[72] Inventor  Lewis Michnik
               Buffalo, N.Y.
[21] Appl. No. 856,688
[22] Filed     Sept. 10, 1969
[45] Patented  July 20, 1971
[73] Assignee  Sierra Research Corporation

[54] VOR/DME, TACAN AND VORTAC HAVING INCREASED CAPABILITY
     5 Claims, 1 Drawing Fig.
[52] U.S. Cl. ............................................. 343/6.5 LC, 343/7.5
[51] Int. Cl. ............................................. G01s 9/56
[50] Field of Search ................................ 343/6.5, 6.5 LC, 7.5

[56] References Cited
     UNITED STATES PATENTS
     3,440,652  4/1969  Bates et al. .................. 343/6.5 X
     3,521,278  7/1970  Michnik et al. ............... 343/7.5 X Primary Examiner—Malcolm F. Hubler
Attorney—Alexander and Dowell ABSTRACT: A modified VOR/DME, TACAN or VORTAC system having ground stations synchronized to a master time and transmitting marker signals timed to a precise rate by the clock, and having a DME transponder; in combination with aircraft having standard DME cooperating with the ground DME to measure range by the round trip pulse technique, and the aircraft each having a local time clock and means to synchronize the time clock to the ground station clocks upon receipt of a marker signal by using the two-way DME measured range to compensate for marker signal transit time to the aircraft, and the aircraft including one-way range measuring and indicating means based on local synchronized clock time, and the aircraft further including means to render the clock synchronizing means and the two-way DME range measuring means operative only during brief intervals interspersed with much longer inoperative intervals, thereby to reduce the frequency of ground station DME interrogations by each aircraft without reducing the rate of range data acquisition thereby.

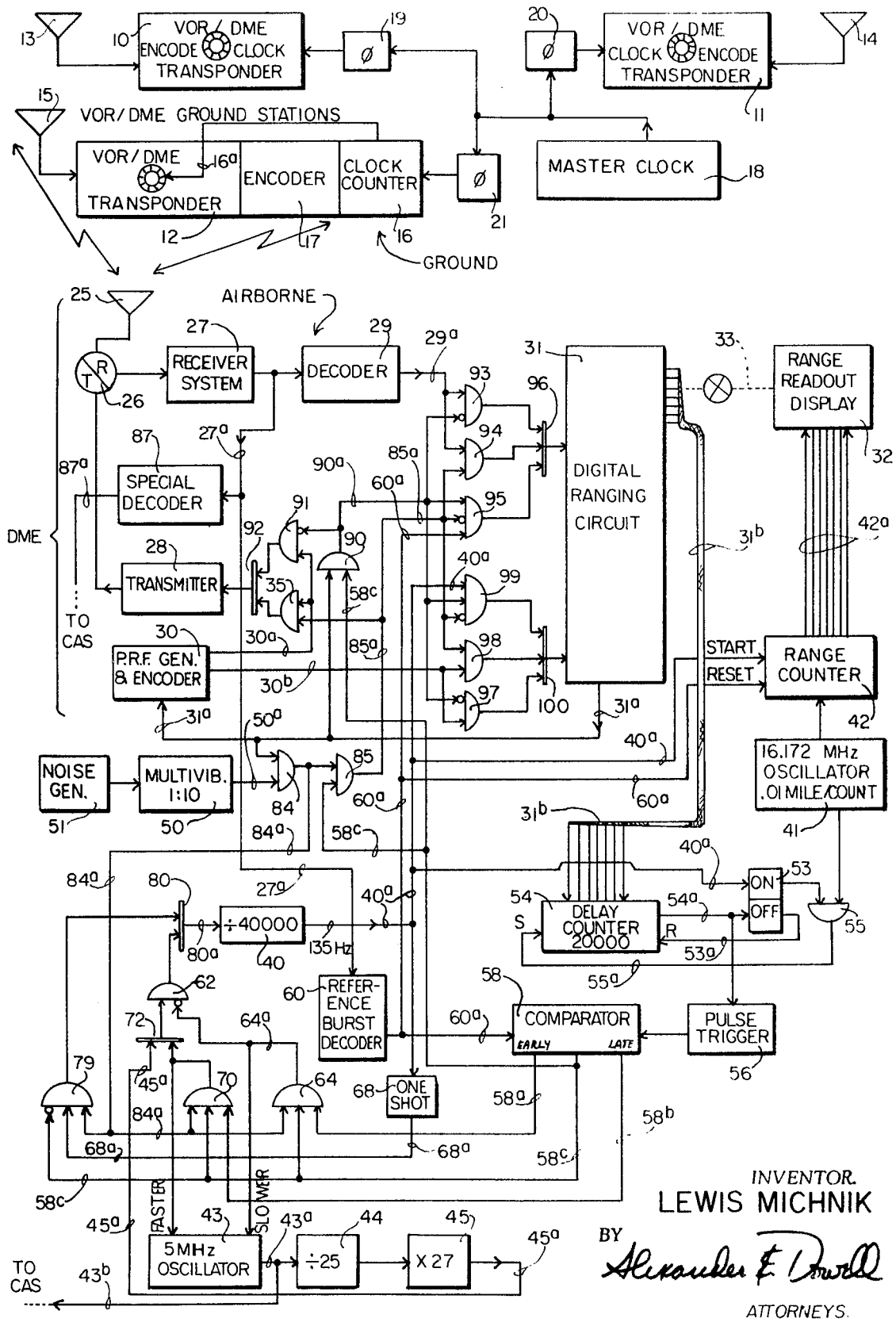

VOR/DME, TACAN AND VORTAC HAVING INCREASED CAPABILITY

This invention relates to improvements in aircraft navigation systems, and more particularly to improvements in VOR/DME, TACAN and VORTAC systems for the purpose of increasing their capability to serve a number of aircraft located in the vicinity of such ground stations at any particular time.

At present the national and international standards for stations of the above type effectively limit an aircraft having a DME designed to cooperate with such ground stations to interrogations not exceeding about 30 pulse pairs per second, assuming a searching time of 5 percent and a tracking time of 95 percent. During the search time, the pulse repetition frequency shall not exceed 150 pulse pairs per second. On the ground, the VOR/DME, TACAN or VORTAC stations have their DME transponders adjusted to provide pulse pairs, including both reply pulses and/or squitter pulses, approximately at the rate of 2700 pulse pairs per second that are available for distance measuring. The maximum number of user aircraft which can be serviced by a particular ground station is therefore determined both by the pulse transmission rate of the ground transponders and by the average pulse pair rate of the airborne interrogators. If the airborne interrogators were all to use the maximum rate of 30 pulse pairs per second, then the theoretical maximum number of users would be 2700 divided by 30, or 90 aircraft. However, the aircraft usually use a somewhat slower rate than 30 pulse pairs per second, and therefore the practical number of possible users is usually limited to about 100 aircraft per ground station, which in dense traffic areas may well be an insufficient capability. Therefore this invention seeks to increase the user capacity of such ground stations.

It is a principle object of this invention to increase the capacity of VOR/DME, TACAN, or VORTAC fixed stations by reducing the rate at which aircraft must interrogate the ground stations, without at the same time reducing the rate of information acquisition by participating aircraft concerning range to the station.

In order to increase the service capability of the above-mentioned ground stations, while at the same time not reducing the rate at which the aircraft can make distance determinations with respect to them, the present invention proposes the addition to each ground station of a precise clock for triggering the ground station at regularly spaced intervals to transmit uniquely encoded marker signals in the form of pulse groups. In the present illustrative embodiment the VORTAC or TACAN main reference bursts (MRB) together with the auxiliary reference bursts (ARB) are synchronized to a master clock and used as the aircraft synchronizing marker signals, although the use of these particular bursts for this purpose is only an arbitrary selection, namely so that the special marker references used in this invention for clock synchronization do not require separate pulses, but instead use already existing pulse bursts made available by synchronizing rotation of the antenna pattern with the master clock cycle. In addition, each participating aircraft is also provided with a similar cyclic time clock counting off similar intervals of time, and the aircraft is further provided with a suitable clock synchronizing system using the DME which is assumed to already exist in the aircraft to measure distance to the ground station using round trip techniques in the normal manner. The local synchronizing systems then uses this range information to align the airborne time clock with the ground station time clock. By using a good crystal oscillator in the airborne clocks, it is possible to perform synchronization only occasionally, for instance perhaps once every 20 or 30 seconds, and then in the meantime, use one-way range measurements, employing the received ground station reference bursts as marker signals, and based upon the airborne clock time to measure their propagation time from the known moment of transmission to the moment of reception in order to obtain range measurements. Each aircraft is further provided with an automatic switching device which turns off the DME equipment in the aircraft for intervals of time which are relatively long as compared with shorter intervals of time during which the DME is turned on for the purpose of resynchronizing the local clock. The distance measurements are performed using well-known one-way ranging techniques which permit the aircraft to remain silent so that during the longer intervals it need not be interrogating the ground station. For instance, 90 percent of the time the aircraft can be silent, relying upon the one-way range measurement techniques, and 10 percent of the time the DME would be used in its normal transponder manner to resynchronize the local clock. Appropriate real-time figures might be 2 seconds for the DME clock synchronization operation and 20 seconds for the one-way range measurement based on local clock synchronization. Therefore, in this example an approximate 10 to one increase is obtained in the capability of the ground station to service aircraft in its vicinity.

The various ground stations in a given geographic area respectively operate on different transmit and receive frequencies, and participating aircraft select particular stations by switching to their frequencies. It is therefore desirable that these ground stations have their time clocks mutually synchronized to a master time so that the local time clocks in all aircraft will be synchronized with all local stations when synchronized with any of them, thereby avoiding the necessity for complete resynchronization every time the aircraft switches from one ground station to another. Various schemes have been proposed for this purpose, for instance in copending application Ser. No. 754,074 filed Aug. 20, 1968 and entitled "Synchronized VORTAC/TACAN CAS System" now U.S. Pat. No. 3,521,278. Another satisfactory scheme is provided in copending application Ser. No. 754,073, filed Aug. 20, 1968, and entitled "Mobile Clock Synchronization Techniques," now U.S. Pat. No. 3,521,279.

A further degree of utility can be added to the present system by having the ground station clocks synchronized with an overall collision avoidance system using an area-wide master time as set forth in the above copending applications. This provides each aircraft whose local clock is synchronized with master clock time with the capability of also performing collision avoidance measurements with other aircraft, and requires only a very reasonable amount of additional equipment to be added to each aircraft. A further possibility is to have the rotating antenna patterns which exist at many DME ground stations synchronized with the marker signal pulse groups periodically transmitted by the ground station, as in the present illustrative embodiment where the MRB and ARB reference bursts are used, although this degree of synchronization is not necessary to the proper functioning of the present invention.

As pointed out in the above copending applications, in collision avoidance system specifications as presently written, a new ground epoch commences every 6 seconds, and it is a relatively easy matter to synchronize the clocks both in the ground and in the airborne components of the system, and also synchronize the rotation of the antenna patterns, to this ground epoch cycle of the collision avoidance specifications. One way of accomplishing this purpose is to synchronize the existing main and auxiliary reference bursts of the ground stations to the ground epoch synchronizing pulse groups of the collision avoidance system. The main reference burst of the ground station occurs at a 15 cycle per second rate. By using a suitable speed control, the rotation of the antenna pattern can be governed by the master clock on the ground, this type of control being accomplished by utilizing a pickoff that generates a signal as the antenna passes a certain heading. The rotation speed is controlled so that the pulses from the pickoff occur at the same time as the pulses that are generated by the master clock.

As the antenna pattern rotates every 90th main reference burst can be specially encoded as a ground epoch pulse group, such pulse group occurring every 6 seconds. In any event, the collision avoidance system (CAS) clock constitutes the master time, and therefore will be the controlling system wide source, and the ground station antenna rotation will be synchronized to it so that a boundary of every 90th rotation falls exactly upon the CAS epoch synchronizing ground pulse At the present time, a 5 MHz. clock oscillator is used as the basic count in collision avoidance equipment. However, this rate cannot be divided easily into 135 pulses per second, matching the reference bursts of the ground station, and therefore the present disclosure divides the 5 MHz. clock rate by 25 and multiplies it by 27 to obtain a 5.4 MHz. clock rate which can then be divided by a factor of 40,000:1 to obtain a 135 pulse per second output. This rate is used as the rate at which the one-way range measurements are made in the present illustrative example about to be described. This more complex illustrative embodiment, in which the rotating pattern and the collision avoidance clocks as well as the clocks in the ground airborne units are all synchronized together, is employed to tie together the assignee's various disclosures in this field, to show their unitary and cooperative nature, although there is no necessity for introducing the collision avoidance system, as far as the present invention is concerned, in view of the fact that the present purpose is merely to increase the number of aircraft which can be served by each ground station of the VOR/DME, TACAN, or VORTAC type.

Other objects and advantages of the invention will become apparent during the following discussion of the drawing.

The drawing shows an embodiment of the invention illustrated as a block diagram which is compatible with collision avoidance worldwide master time.

Referring now to the drawing, the upper part of the illustrative embodiment shows VOR/DME, VORTAC, or TACAN ground stations occupying different mutually spaced fixed locations. Three ground stations 10, 11 and 12 are shown for illustrative purposes and each includes standard DME equipment, antennas 13, 14, and 15, and a rotating pattern from which user aircraft can obtain their bearings, although the latter equipment is not necessary to the present invention. These ground stations have been augmented by providing them with internal clocks, such as the clock 16 connected with the ground station 12 and coupled via wire 16a to synchronize the rotation of the stations antenna pattern. The master clock serves to provide synchronization for antenna rotation, for the MRB and the ARB transmissions, and if the system is compatible with CAS associated equipment the clock will provide a specially encoded epoch marker group every 90th MRB pulse. This clock actually comprises a cyclic counter which is capable of counting out a repeating time sequence, during at least one predetermined moment of which the local station transmits a uniquely encoded marker pulse group. For this purpose, the encoder 17 is provided to drive the local transmitter which comprises a part of the DME transponder. If only one ground unit were employed, the clock 16 could be driven by a local stable oscillator, but the present drawing shows a more realistic and practical system in which there is a central master clock 18 supplying pulses to drive all of the local clocks in the various ground stations 10, 11 and 12. The master clock 18 drives the local clock counters such as the counter 16 through appropriate phasing circuitry 19, 20 and 21 which serves the purpose of compensating transit time delays of the pulses from the master clock 18 to the local clock counters, such as the counter 16, after these phasing circuits have been appropriately preadjusted. The same master clock generator 18 which drives all of the ground stations in mutual synchronism, may also comprise the master clock in a collision avoidance system, using one-way ranging techniques based upon synchronized clocks in the various participating aircraft, all as previously mentioned in this specification. Since the various ground stations actually transmit and receive on mutually distinct frequencies, the various airborne units such as the one shown in the lower portion of the FIGURE of the drawing will communicate with only one ground station at a time and will distinguish between the various stations by virtue of the different transmitting and receiving frequencies of which they operate.

Turning now to the airborne equipment, this equipment comprises several different units, including a modified standard airborne DME shown at the top of the airborne units in the drawing, and further including a clock synchronizing system shown in the lower portion of the drawing.

It will be recalled from the foregoing portions of this specification that the standard DME in the aircraft performs its intended distance measuring functions only occasionally, and uses the measured range to correct the aircraft time clock, and that during the remainder of the time, when the DME remains inoperative, the range to the selected ground station is measured by the one-way ranging technique for determining the elapsed time between the known instant of transmission of the ground station marker pulse group as determined according to the airborne synchronized clock, and the moment at which this transmitted marker group actually arrives at the aircraft as determined also by the airborne clock. As a matter of fact, in the present illustrative embodiment, the one-way ranging system performs continuously and is the sole source of range data displayed to the pilot.

The various components of the airborne equipment will now be described in greater detail, omitting for the sake of simplicity any discussion of customary interrogator/transponder delays which are of fixed duration.

The standard DME in the aircraft includes an antenna 25 connected by a diplexer 26 to a receiver 27 and a transmitter 28. The receiver and the transmitter are both tunable to select one particular ground station according to the latter's operating frequencies. Having selected such a station, the receiver 27 delivers video signals upon a wire 27a into a decoder 29 which decodes pulse groups comprising pairs of pulses having a definite separation corresponding with the spacing of interrogation pulses sent out by the transmitter 28 as initiated by the random PRF generator 34 and the encoder 30 in the standard airborne DME. Such pulses when decoded are delivered on wire 29a which in an unmodified DME would go to a digital ranging circuit 31 which is also a standard and part of a DME. The DME also includes a range readout and display 32, which in an unaltered DME is connected to the ranging circuit 31 by the wiring shown in broken lines at 33, this wiring having been disconnected incident to modifying the DME. The readout and display 32 is used in a manner to be hereinafter described. The random pulse repetition frequency generator 34 is connected to drive the encoder 30 through gate means to be described hereinafter to cause it to enable the transmitter to send out interrogation pulse groups at moments which are not altogether uniform with regard to their repetition rate for reasons well known in the prior art, i.e. so that each aircraft can identify its own interrogation pulses among the multitude of pulses initiated by other aircraft since its own pulses are the only ones which will stand still with relation to the locally generated time base. The gates 35, 90, 91 and 92 have also been interposed as further alterations to control the wire 30a, and these gates serve to disable the local DME in a manner to be hereinafter explained. The encoder 30 also generates on wire 30b a timing reference which in an altered DME is sent to the ranging unit 31, but according to the present alteration gates 97, 98, and 100 have been interposed to control this timing signal as explained hereinafter. The digital ranging circuit 31 also puts out a signal on the wire 31a to control the random pulse generator by indicating to it when the circuit has locked onto its own DME-initiated pulse groups, and is therefore ready to measure range to the ground station in a reliable manner. The digital ranging circuit 31 includes wires 31b whose outputs indicate range as multiple binary bits which are employed to assist in synchronizing the aircraft time clock with the time clock located in the ground station being interrogated.

The aircraft has its own time clock system, including at the bottom of the drawing a clock oscillator 43 which supplies wire 43a with clock pulses occurring at a 5 MHz. repetition rate, and these pulses are used as the basic clock rate in the aircraft. However, as pointed out at the beginning of this specification, it may be desirable to have the system synchronized with a standard collision avoidance system which also uses 5 MHz. pulses as a master clock rate. However, when dealing with VORTAC or TACAN equipment, which uses a 15 Hz. MRB pulse rate and a 135 Hz. MRB+ARB pulse rate, it is desirable to synchronize the antenna pattern rotation of the ground station with the CAS clock rate in such a way as to make available a local clock count at the rate of 135 pulses per second. This number of pulses per second is not easily obtainable from a 5 MHz. clock oscillator, and therefore it is necessary to divide the 5 MHz. clock rate by a factor of 25 in the unit 44 and multiply it again by a factor of 27 in the unit 45 in order to obtain on the wire 45a a 5.4 MHz. clock pulse rate, which when divided by the 40,000:1 divider 40 delivers 135 pulses per second on the wire 40a. It will presently appear why this number of pulses per second is desirable. In the event that the aircraft also includes a full collision avoidance system (not shown) its clock can be driven by pulses from the wire 43b.

Recalling for the moment that a standard TACAN or VORTAC unit transmits reference pulse bursts at the rate of 135 groups per second incident to the rotation of its antenna, this frequency provides a convenient data acquisition rate for the present improved system. The ground station actually transmits pulses at two different frequencies, namely the MRB pulses at a 15 cycle rate and the MRB+ARB pulses at a 135 pulse per second rate. The selection of these reference bursts is an arbitrary selection, but a convenient one when dealing with VORTAC/TACAN type ground station systems.

The operation of the present illustrative embodiment can be described in detail as follows: In the lower portion of the present drawing there are two sources of 135 Hz. pulses. One source is the output on wire 40a from the local clock divider 40, and these pulses are locally generated at a rate which is not only stable but must be synchronized to the ground station reference burst rate by periodic correction of the rate of the local airborne clock. The other source in the aircraft of 135 Hz. pulses is the output of the reference burst decoder 60 which is connected to the receiver 27 in the airborne DME by the wire 27a, and which decoder decodes the MRG+ARG reference bursts to provide a 135 Hz. output on wire 60a, but these pulses are not generated locally. Instead they are generated by the ground station under the control of the master clock 18. When these two sources of 135 Hz. pulses are brought into step with each other after compensating for range separation, the local clock is synchronized to the ground station master clock. Another decoder 87 is provided for decoding the aforementioned special ground epoch pulse groups occurring every six seconds if the ground station is part of a CAS network. The output of the decoder 87 on wire 87a goes to the airborne CAS system (not shown).

Synchronization is accomplished in the following manner: The output of the divider 40 on the wore 40a turns on a control flip-flop 53 which then enables the AND gate 55 to commence admitting clock pulses from the 16.172 MHz. oscillator 41 for the purpose of counting up the range delay counter 54. This flip-flop 53 is turned on upon the appearance of each 135 Hz. pulse on the wire 40a, and the pulses on the wire 55a then begin counting the delay counter 54 upwardly toward overflow. However, the delay counter 0.01 54 has just had a binary number set into it from the digital range circuit 31 located in the airborne DME via the binary wires 31b. The wires 31b are connected into the delay counter 54 in such a way as to set the complement of the digital range into the counter 54 which then begins counting upwardly in response to pulses applied through the wire 55a. When the delay counter 54 reaches overflow it then delivers an output on the wire 54a to turn off the flip-flop 53 and stop the counting pulses on the wire 55a from entering the counter 54. An output on wire 53a also simultaneously resets the counter 54. Thus, the upward counting of the complement preset counter 54 is commenced by each arriving 135 Hz. pulse from the counter 40 and is terminated when the counter 54 overflows. The counter 54 has a maximum count of 20,000, assuming a 200 mile range for the DME and a scale factor of 0.01 nautical mile for the standard digital ranging circuit 31 and the range readout display 32. The function of the counter 54 is to delay the airborne clock count on the wire 40a by the same amount of time that the reference burst pulse group from the ground station 12 is delayed by traveling to the aircraft, i.e. range delay. These two items can be compared in a comparator 58 to determine which occurs first, thereby to determine whether the clock in the aircraft is fast or slow with respect to the synchronization reference bursts transmitted by the ground station 12 when initiated by its clock 16 and encoder 17. When the counter 54 overflows, the pulse trigger circuit 56 emits a signal to the comparator 58 which generates one of two possible signals corresponding to "early" or "late" pulse arrivals for use as outputs from the comparator 58. These signals alternatively appear as a pulse on line 58a or 58b which ever is appropriate, provided the difference in times of arrival at the comparator of the signals on wires 56a and 60a is small, meaning the signals are close to coincidence. However, if no substantial coincidence can be found by the comparator 58, meaning that the times of arrival are rather far apart, then no pulse will appear on either wire 58a or 58b, and a coarse searching or strobing function is initiated in an effort to find near coincidence. When reference bursts transmitted by the ground station 12 are decoded onto wire 60a near the time of arrival of the compensated pulses appearing on the wire 56a, the comparator 58 puts out a signal on wire 58c and the system then begins fine adjustments in the counter chain to improve synchronization therewith, in the manner to be explained in greater detail hereinafter.

In order to prevent spurious outputs from the comparator 58 as a result of occasional accidental coincidences from extraneous signals such as reply signals triggered by other aircraft, an integrating circuit (not shown) can be inserted into each of the "early" and "late" coincidence circuits in the comparator 58 so that it requires an unbroken succession including a predetermined number of near coincidences to create an output on either of the wires 58a or 58b. The comparator 58 also has a third output on wire 58c. This output occurs in response to near-coincidence, but is absent when coincidence fails. Whereas the outputs on wires 58a and 58b are brief pulses, the output on wire 58c is of longer duration, i.e. lasting for a time period equivalent to the longest "OFF" time of the multivibrator 50.

If the local clock is badly out of synchronization so that none of the wires 58a, 58b, or 58c has an output, there will be no signal on wire 58c to inhibit the gate 79, and the absence of an inhibit signal will thereby permit the gate 79, if it also has an enable signal on wire 84a, to route the pulses from wire 68a through OR gate 80 which pulses insert extra counts into counter 40 to strobe it rapidly along in search of a near coincidence condition as will be indicated when "early" or "late" signals begin appearing again on the wires 58a or 58b. The pulses on wire 68a are generated by one-shot 68 which is triggered by the counter 40 output on wire 40a. As long as failure of coincidence in the time comparator 58 continues so that no signal appears on wire 58c, and provided the signal on wire 84a continues, the gate 79 will be uninhibited and will permit additional pulses from line 68a to enter the counter 40 through the OR gate 80, to continue the "strobing" function in an attempt to locate and lock onto the reference burst synchronization pulses transmitted by the ground station 12. Eventually when such pulse groups are located, and virtual coincidences begin occurring regularly in the comparator 58, a signal will appear on line 58c to inhibit gate 79 and prevent the strobe pulses from wire 68a from being applied to counter 40, whereby the more rapid searching or strobing function will be stopped.

As stated above, when reasonably close coincidence begins to be detected by the comparator 58, a pulse will appear either on wire 58a or 58b, depending on whether the local clock is running slightly early or late. If the counter chain 40 and 54 is running early, it can be slowed somewhat by skipping some of the input pulses on the wires 45a and 80a to the first counter 40, this being accomplished by inhibiting a normally conductive gate 62 by providing an inhibit signal on the wire 64a coming from the AND gate 64 when enabled by an output on wire 58a, namely the "early" output from the comparator 58, provided signals are present on wires 58c and 84a. Therefore, when an early pulse appears on wire 58a, and the AND gate 64 is enabled, the "early" pulse will pass through the gate 64 and inhibit the gate 62 just long enough for one of the main clock oscillator pulses on wire 45a to be omitted, thereby throwing the clock counter chain slightly later to bring it into better synchronization with the phase of the pulses being decoded by the decoder 60 and representing received auxiliary reference bursts. By this means, as long as the range-delay count in the counter 54 overflows earlier than the arrival of a synchronization pulse group from the decoder 60, the counter chain 40 and 54 will be made later and later in time, until it becomes coincident therewith.

Conversely, if the count in the chain 40 and 54 is late with respect to the pulse groups being decoded in the decoder 60, then additional pulses should be added to the wire 80a to advance the count in the chain 40 and 54 and bring it into step. This is accomplished when an enabling signal appears on the wire 58c together with an enabling signal on wire 84a to enable the AND gate 70 and therefore allow a "late" pulse on wire 58b, when it occurs, to pass through the gate 70 and through the OR gate 72, and be applied to the wire 802 to advance the counter 40 by augmenting the normal clock oscillator pulses on wire 45a, thereby increasing the rate of the counter chain 40 and 54 and tending to make it catch up with the synchronization pulse groups being decoded by the special decoder 60. When perfect coincidence of the signals on the wires 56a and 60a occurs, the system operation from then on will tend to cause the comparator 58 to dither back and forth every few pulses, sometimes adding a little to the counter 40, and at other times subtracting a little from that count, but generally keeping it inclose step with the main and auxiliary reference burst groups being decoded by the decoder 60.

In addition, the early and late signal wires 64a and 70a can be connected to corrective circuitry (not shown in detail) within the 5 MHz. crystal oscillator 43 to cause the oscillator to oscillate at a slightly lower or faster rate in order to improve the synchronization of the local clock system by fine adjustments in the oscillator itself.

It should also be noted that once the clock is synchronized in the aircraft, the output of the counter 40 on wire 40a will occur at a time which is earlier than the output of the reference decoder 60 on the wire 60a by a time interval which is directly proportional to one-way range. Therefore, the output on the wire 40a is used to start a range counter 42 counting upwardly, and the output on the wire 60a is used to reset the range counter 42 to zero. The range counter is counted upwardly by clock pulses from a 16.172 MHz. clock oscillator 41, each pulse of which represents 0.01 mile. The binary output of the range counter on wires 42a represents a digital readout of the range in hundredths of a mile, and this readout is then suitable for display in the range readout display 32 which comprises a part of the standard airborne DME system previously described. Thus, the present system provides continuous one-way range readings, but uses the DME round trip range determinations only for resynchronizing its local time clock, and this resynchronization is accomplished only occasionally. The better the quality of the crystal oscillator 43 the less frequently will synchronization have to take place.

First, assume that there is no synchronization of the clock in the aircraft with ground station master time clock. Therefore, there will be no signal appearing on the wire 58c from the comparator 58, and the gates 85 and 90 will both be blocked. Moreover, there will be no signal appearing on the wire 90a, with the result that the gates 91, 93, and 97 will be enabled at their inverting inputs. This will permit the DME to operate full time in its normal manner, i.e. as though no alteration had been made in the DME. For example, the PRF generator will deliver pulses on the wire 30a through the AND gate 91 and the OR gate 92 to drive the transmitter with encoded trigger signals designed to obtain a transponder reply from the ground station 12, and this reply will be decoded in the decoder 29 and will appear on the wire 29a, passing through the gate 93 and the OR gate 96 into the digital ranging circuit in the normal manner of operation of an airborne DME. Moreover, the PRF generator 30 will deliver on wire 30b a timing signal passing through the gate 97 and the OR gate 100 for use by the digital ranging circuit 31 in determining range to the ground station. The digital ranging circuit in effect compares the occurrence of the timing signal arriving through the gate 100 with the time of the reply signal arriving through the gate 96 and delivers an output on the wires 31b indicating range. Moreover, the standard DME delivers a "lock-on" on wire 31a indicating that it has found its own reply pulses and is locked into them. This "lock-on" signal enables the gate 84 and the left side of the gate 90, and the signal on wire 84a then enables the gates 79, 70 and 64 at one of their inputs, thereby permitting the clock synchronizing system to function in the manner described above. The DME continues operating in the manner just described despite the fact that the duty-cycle switch multivibrator 50 is rendering outputs on the wire 50a only one-tenth of the time. This condition continues until an approximate synchronization is detected by the comparator 58, which then puts out a signal on wire 58c. The effect of the signal on wire 58c is, among other things, to change over the operation of the DME from full time operation to low duty-cycle operation so that its transmitter 28 functions, only 10 percent of the time, in the present illustrative example, to interrogate the ground station transponder.

When the comparator 58 delivers a signal on wire 58c, indicating a substantial degree of synchronization of the aircraft time clock, the signal on wire 58c enables the right input to the gate 90 and places an enable signal on wire 90a, at the same time blocking the gate 91. In addition, the signal on wire 90a blocks the gates 93 and 97, whereby the DME is deprived of its trigger signal applied through the gate 91 to the transmitter 28, and the ranging circuit 31 is deprived of its range input through gate 96 and its timing signal through the OR gate 100 as previously described. Instead, the DME is effectively reconnected to receive signals through other ones of the gates. The gate 85 is now enabled by the signal on wire 58c, and therefore the duty-cycle switching signals from the wire 50a pass through the gates 84 and 85 into the wire 85a which accordingly becomes enabled one-tenth of the time. During this duty-cycle "ON" period, the wire 85a enables the gate 35 to deliver PRF trigger encoder signals from the wire 30a through the gates 35 and 92 to render the transmitter 28 operative to interrogate the ground station 10 percent of the time. During this same 10 percent of the time, the wire 85a enables the gates 94 and 98 to apply decoded range reply signals from the wire 29a through the gate 96 into the digital ranging circuit 31, and to apply timing signals from the wire 30b through the gate 98 and the gate 100 into the digital ranging circuit 31 so that this ranging circuit becomes operative during the 10 percent "ON" duty-cycle to deliver range indications to the wires 31b. However, during the 90 percent "OFF" time, the wire 85a is disabled, thereby blocking the gate 35 and the gates 94 and 98.

One practical problem occurs as a result of the turning off of the DME during the 90 percent "OFF" time. This problem occurs because of the fact that the digital ranging circuit would lose its lock-on signal from the wire 31a, and would therefore have to strobe in order to regain lock-on during each 10 percent "ON" duty-cycle when the DME becomes operative through the gates 35, 94 and 98. In order to preserve lock-on, the gates 95 and 99 have been added. These gates are both blocked by signals on the wire 85a which are present during the 10 percent "ON" time, but they are unblocked during the 90 percent "OFF" time. The gates 95 and 99 are each partially enabled at a second input by the signal on wire 90a which is present when lock-on is being signalled on the wire 31a and also reasonable clock synchronization is being signalled on the wire 58a. Adequate lock-on is maintained by applying the decoded reference burst signal on wire 60a through the gates 95 and 96 into the digital ranging circuit 31 and by applying the local clock signal from the wire 40a through the gates 99 and 100 as a timing signal, these signals being applied to the digital ranging circuit during the 90 percent "OFF" time when the range determination from the DME is not being used to resynchronize the local time clock. In this sense the application of the signal on the wires 60a and 40a through the gates 95 and 99 to the ranging circuit 31 is merely a "keep alive" signal to prevent the digital ranging circuit from going through a new strobe function at the end of each 90 percent "OFF" duty cycle interval. No doubt there are other simple ways of avoiding strobing after each 90 percent "OFF" cycle of the switch multivibrator 50.

It is not desirable from the viewpoint of mutual interference to have all of the various aircraft located within range of a particular ground station become synchronized as to the times at which their various DME interrogators are transmitting. For this reason, a noise generator 51 is used to modulate in a random manner the duty cycle of the multivibrator 50 so that the various aircraft have their DME transmitters operative at randomly determined times, and therefore at different times when considered on the average. Thus, any particular aircraft will actually be interrogating the local ground station only a small percentage of the time, selected arbitrarily in the present example as about 10 percent of the time. Furthermore, because of the random rate of the multivibrators 50 in the various aircraft, the aircraft will not be likely to select the same interval of time for interrogation of the transponder at the ground station, and if such overlapping should occur, it will tend to occur for only a brief interval and until the two multivibrators 50 in the interfering aircraft drift apart because of their randomly controlled cycle of operation.

Having thus described my invention, and illustrated it with a practical working embodiment, I now present the following claims.

1. A system for increasing the capability of a VOR/DME, VORTAC or TACAN type fixed-position station with regard to the number of aircraft that it can serve at a given time, comprising in combination:
   a. transponder means at each ground station responsive to interrogation by said aircraft to transmit a reply signal to the aircraft;
   b. DME means in each aircraft for interrogating the transponder means and computing range to the station based upon the elapsed time between its interrogation and the reception of said reply signal;
   c. cyclic time clock means at each ground station for initiating at accurately predetermined instants transmissions from the station of marker pulse groups;
   d. clock means in each aircraft for counting out a similar time cycle;
   e. means at the aircraft for synchronizing the aircraft clock means with the ground station clock means based upon said DME computed range and upon the moment of reception of the ground station marker pulse group; and
   f. repeating switch means operative to enable said aircraft DME and said synchronizing means for relatively short intervals of time as compared with longer intervening intervals of time during which they are disabled.

2. In a system as set forth in claim 1, said repeating switch means having a random component in its time interval determinations whereby the time intervals are not all of identical duration.

3. In a system as set forth in claim 1, said synchronizing means having signals for indicating when the clock means in the aircraft is and is not closely synchronized to the ground clock means; gate means responsive to not-synchronized condition for actuating the DME in the aircraft to measure range during both the short and the longer intervals, and responsive to closely synchronized condition to actuate the DME to measure range during said short intervals and to disable the DME and the synchronizing means during said longer intervals.

4. In a system as set forth in claim 1, each aircraft including means for displaying range to a ground station; means for making one-way range measurements to a ground station based upon the predetermined instants of ground station transmissions of its marker pulse groups and upon the instants of reception at the aircraft of those pulse groups, both as determined by the aircraft synchronized clock means; and means coupling the one-way range measurements to the display means in the aircraft.

5. In a system as set forth in claim 4, said aircraft DME including means to lock onto reply signals generated in response to its own interrogations of the ground station during said short intervals, and gate means operative during said longer intervals of inactivity of said DME for introducing thereinto range information from said means for making one-way range measurements to maintain alive said lock-on means of the DME.